United States Patent
Wang et al.

(10) Patent No.: US 11,157,764 B2
(45) Date of Patent: Oct. 26, 2021

(54) SEMANTIC IMAGE SEGMENTATION USING GATED DENSE PYRAMID BLOCKS

(71) Applicant: INTEL CORPORATION, Santa Clara, CA (US)

(72) Inventors: Libin Wang, Beijing (CN); Anbang Yao, Beijing (CN); Jianguo Li, Beijing (CN); Yurong Chen, Beijing (CN)

(73) Assignee: Intel Corporation, Santa Clara, CA (US)

(*) Notice: Subject to any disclaimer, the term of this patent is extended or adjusted under 35 U.S.C. 154(b) by 127 days.

(21) Appl. No.: 16/489,084

(22) PCT Filed: Mar. 27, 2017

(86) PCT No.: PCT/CN2017/078256
§ 371 (c)(1),
(2) Date: Aug. 27, 2019

(87) PCT Pub. No.: WO2018/176186
PCT Pub. Date: Oct. 4, 2018

(65) Prior Publication Data
US 2020/0005074 A1    Jan. 2, 2020

(51) Int. Cl.
*G06K 9/62*   (2006.01)
*G06K 9/46*   (2006.01)
*G06N 3/04*   (2006.01)

(52) U.S. Cl.
CPC ......... *G06K 9/4628* (2013.01); *G06K 9/6257* (2013.01); *G06K 9/6274* (2013.01); *G06N 3/04* (2013.01)

(58) Field of Classification Search
CPC .. G06K 9/4628; G06K 9/6257; G06K 9/6274; G06K 9/00684; G06N 3/04
See application file for complete search history.

(56) References Cited

U.S. PATENT DOCUMENTS

| | | |
|---|---|---|
| 10,019,657 B2 | 7/2018 | Lin et al. |
| 2014/0037198 A1* | 2/2014 | Larlus-Larrondo ..... G06T 7/162 382/159 |
| 2015/0117760 A1 | 4/2015 | Wang et al. |

(Continued)

FOREIGN PATENT DOCUMENTS

| | | |
|---|---|---|
| CN | 105741316 A | 7/2016 |
| CN | 106204522 A | 12/2016 |

OTHER PUBLICATIONS

Kim, Seungryong, Dongbo Min, Stephen Lin, and Kwanghoon Sohn. "Deep Self-Convolutional Activations Descriptor for Dense Cross-Modal Correspondence." arXiv preprint arXiv: 1603.06327 (2016). (Year: 2016).*

(Continued)

*Primary Examiner* — Carol Wang
(74) *Attorney, Agent, or Firm* — Hanley, Flight & Zimmerman, LLC

(57) ABSTRACT

An example apparatus for semantic image segmentation includes a receiver to receive an image to be segmented. The apparatus also includes a gated dense pyramid network comprising a plurality of gated dense pyramid (GDP) blocks to be trained to generate semantic labels for each pixel in the received image. The apparatus further includes a generator to generate a segmented image based on the generated semantic labels.

20 Claims, 6 Drawing Sheets

(56) References Cited

U.S. PATENT DOCUMENTS

| | | | |
|---|---|---|---|
| 2016/0358337 A1* | 12/2016 | Dai | G06T 7/11 |
| 2018/0253622 A1* | 9/2018 | Chen | G06N 3/08 |
| 2020/0401851 A1* | 12/2020 | Mau | G06K 9/6292 |

OTHER PUBLICATIONS

Colovic, Aleksander, Patrick Knbbelreiter, Alexander Shekhovtsov, and Thomas Pock. "End-to-end training of hybrid CNN-CRF models for semantic segmentation using structured learning." In Computer Vision Winter Workshop, vol. 2. 2017. (Year: 2017).*

Kim, Seungryong, Dongbo Min, Bumsub Ham, Sangryul Jeon, Stephen Lin, and Kwanghoon Sohn. "Fcss: Fully convolutional self-similarity for dense semantic correspondence." In Proceedings of the IEEE conference on computer vision and pattern recognition, pp. 6560-6569. 2017. (Year: 2017).*

Long, Jonathan, Evan Shelhamer, and Trevor Darrell. "Fully convolutional networks for semantic segmentation." In Proceedings of the IEEE conference on computer vision and pattern recognition, pp. 3431-3440. 2015. (Year: 2015).*

Qi, Guo-Jun. "Hierarchically gated deep networks for semantic segmentation." In Proceedings of the IEEE Conference on Computer Vision and Pattern Recognition, pp. 2267-2275. 2016. (Year: 2016).*

Islam, Md Amirul, Shujon Naha, Mrigank Rochan, Neil Bruce, and Yang Wang. "Label refinement network for coarse-to-fine semantic segmentation." arXiv preprint arXiv: 1703.00551 (2017). (Year: 2017).*

Ghiasi, Golnaz, and Charless C. Fowlkes. "Laplacian pyramid reconstruction and refinement for semantic segmentation." In European conference on computer vision, pp. 519-534. Springer, Cham, 2016. (Year: 2016).*

Wang, Jianhua, Chuanxia Zheng, Weihai Chen, and Xingming Wu. "Learning contextual information for indoor semantic segmentation." In 2016 IEEE 11th Conference on Industrial Electronics and Applications (ICIEA), pp. 1639-1644. IEEE, 2016. (Year: 2016).*

Noh, Hyeonwoo, Seunghoon Hong, and Bohyung Han. "Learning deconvolution network for semantic segmentation." In Proceedings of the IEEE international conference on computer vision, pp. 1520-1528. 2015. (Year: 2015).*

Chen, Liang-Chieh, George Papandreou, Iasonas Kokkinos, Kevin Murphy, and Alan L. Yuille. "Semantic image segmentation with deep convolutional nets and fully connected crfs." arXiv preprint arXiv: 1412.7062 (2014). (Year: 2014).*

International Search Report for PCT Application No. PCT/CN2017/078256 with a completion date of Aug. 7, 2017 and dated Jan. 9, 2018, 4 pages.

Mousavian et al.: "Joint Semantic Segmentation and Depth Estimation with Deep Convolutional Networks", Computer Vision and Pattern Recognition (cs.CV), arXiv:1604.07480 [cs.CV], Submitted on Apr. 25, 2016 (v1), last revised Sep. 19, 2016 (this version, v3)) Cornell University, 9 pages.

Sermanet et al.: "Pedestrian Detection with Unsupervised Multi-Stage Feature Learning" (Submitted on Dec. 1, 2012 (v1), last revised Apr. 2, 2013 (this version, v2)) arXiv:1212.0142 [cs.CV] Cornell University, 12 pages.

Passino et al.: "Pyramidal Model for Image Semantic Segmentation" 2010 International Conference on Pattern Recognition, https://www.researchgate.net/profile/Ebroul_Izquierdo/publication/220927668_Pyramidal_Model_for_Image_Semantic_Segmentation/links/55131b5b0cf23203199b609a/Pyramidal-Model-for-Image-Semantic-Segmentation.pdf?origin=publication_detail, Oct. 2010, London England.

Volpi et al.: "Dense semantic labeling of sub-decimeter resolution images with convolutional neural networks" Computer Science > Computer Vision and Pattern Recognition, (Submitted on Aug. 2, 2016 (v1), last revised Oct. 10, 2016 (this version, v2)), arXiv:1608.00775 [cs.CV] , Cornell University, 13 pages.

* cited by examiner

SEMANTIC IMAGE SEGMENTATION USING GATED DENSE PYRAMID BLOCKS

CROSS REFERENCE TO RELATED APPLICATIONS

Pursuant to 35 U.S.C. § 371, this application is the United States National Stage Application of International Patent Application No. PCT/CN2017/078256, filed on Mar. 27, 2017, the contents of which are incorporated by reference as if set forth in their entirety herein.

BACKGROUND

Semantic image segmentation (SIS) may be used to predict pixel-wise category labels in images or frames from videos. SIS can obtain semantic labels for every pixel, not just image-wise label like classification and detection. Thus, multiple objects may be detected in an image using SIS semantic labels.

In some examples, SIS may be used in numerous artificial intelligence and computer vision tasks. For example, the task may include object tracking, scene understanding and human-machine interaction. Combined with object classification and detection, SIS systems may be used in applications such as unmanned vehicles including drones and cars, somatosensory games, and robot vision.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, SIS may be used to predict pixel-wise category labels in images or frames from videos. For example, convolutional neural networks (CNNs) may be trained to jointly predict labels of all pixels in an image. However, the information flow between different layers of such CNNs may not be very efficient or effective.

The present disclosure relates generally to techniques for segmenting images semantically using gated dense pyramid (GDP) blocks. Specifically, the techniques described herein include deploying dense connected networks from different middle layers in each of the GDP blocks. Secondly, the GPD blocks may include pyramid features that can capture different scale feature maps simultaneously. In particular, a reverse up-sampling network is designed to recover high resolution features from the low, but semantic, layers in each of the GDP blocks. Finally, a gated weight function is adaptively trained for each of the GDP blocks to balance the importance of features from different layers. In some examples, a more complex cascade structure can be designed by repeating GDP blocks.

The techniques described herein thus enable more powerful classification via the use of dense connected layers rather than the use of single path networks sequentially. In this manner, the techniques described herein can provide richer context information for further classification tasks. Moreover, both global context information and local context information inside the GDP blocks can be used more effectively via the use of the pyramid features. In addition, the techniques described herein may allow more effective integration of the whole information flow within each of the GDP blocks through the use of the gated weight functions. In some examples, the GDP blocks described herein can also be conveniently embedded into other neural networks for improved performance in object classification or detection tasks. Moreover, the techniques described herein may be implemented at near real-time speed and may thus be used in applications such as robotics navigation and other real-time applications. In addition, in one experiment, the techniques described herein were found to perform with a 4.6% gain in accuracy over other methods using a metric of region intersection over union (IoU) for comparison.

Figure 1:
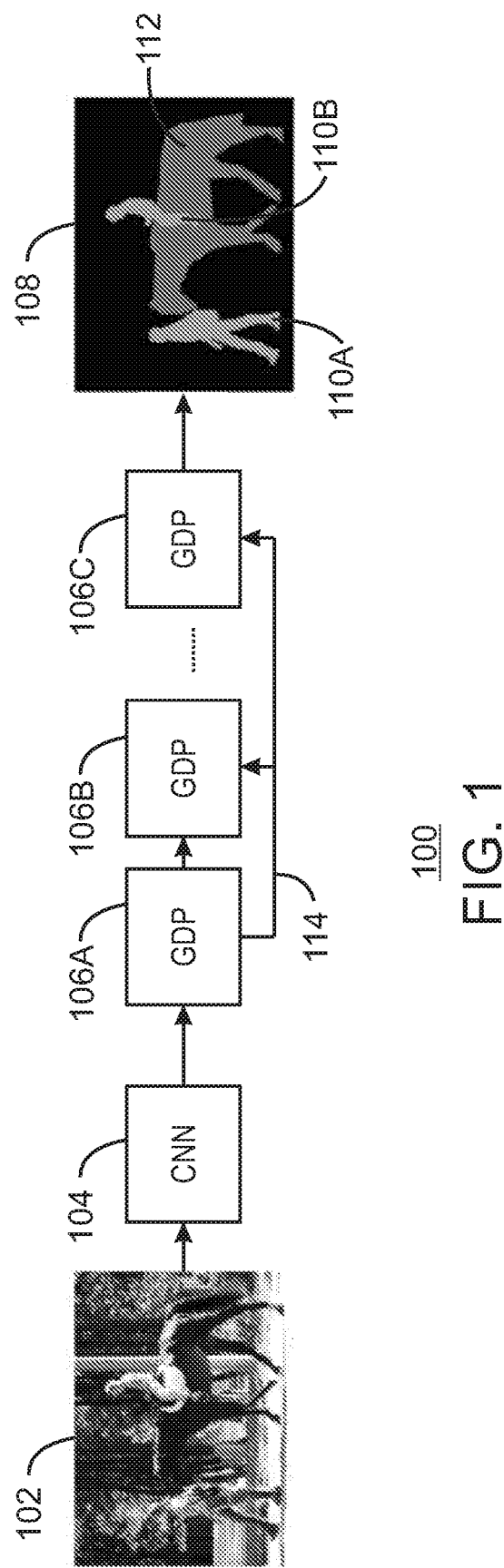
FIG. 1 is a block diagram illustrating an example system for semantic image segmentation using gated dense pyramid blocks.

FIG. 1 is a block diagram illustrating an example system for semantic image segmentation using gated dense pyramid blocks. The example system is referred to generally by the reference number 100 and can be implemented in the computing device 500 below in FIG. 5 using the methods 300 and 400 of FIGS. 3 and 4 below.

The example system 100 includes an input image 102, a convolutional neural network (CNN) 104, a plurality of gated dense pyramid blocks 106A, 1066, and 106C, and an output image 108. In some examples, the input image 102 may be a color image or frame from a video feed. The output image 108 shows three detected objects, including two people 110A and 1106, and a horse 112. In addition, the pyramid blocks 106A, 1066, and 106C are shown coupled by arrows 114.

As shown in FIG. 1, the CNN 104 may receive an image 102 from any image source. For example, the image source may be any suitable imaging devices, such as a camera. The CNN 104 may preprocess the image and output a preprocessed image to the GDP block 106A. The GDP 106A may receive the preprocessed image and send the preprocessed image to GDP blocks 106B and 106C. In some examples, although the number of GDP blocks, shown in FIG. 1 is three, any suitable number of GDP blocks may be used. Thus, the GDP blocks 106A, 1066, and 106C may process the preprocessed image concurrently as indicated by the arrows 114 from GDP block 106A. For example, each of the GDP blocks 106A, 1066, and 106C may be trained as described in FIG. 3 below to process the preprocessed image as described in FIGS. 2 and 4 below. The output of the GDP blocks 106A, 1066, and 106C may be an output image 108 with one or more detected objects. For example, the detected objects of the output image 108 of system 100 include two people 110A and 1106 and a horse 112.

The diagram of FIG. 1 is not intended to indicate that the example system 100 is to include all of the components shown in FIG. 1. Rather, the example system 100 can be implemented using fewer or additional components not illustrated in FIG. 1 (e.g., additional input images, output images, detected objects, CNN, GDP blocks, etc.).

Figure 2:
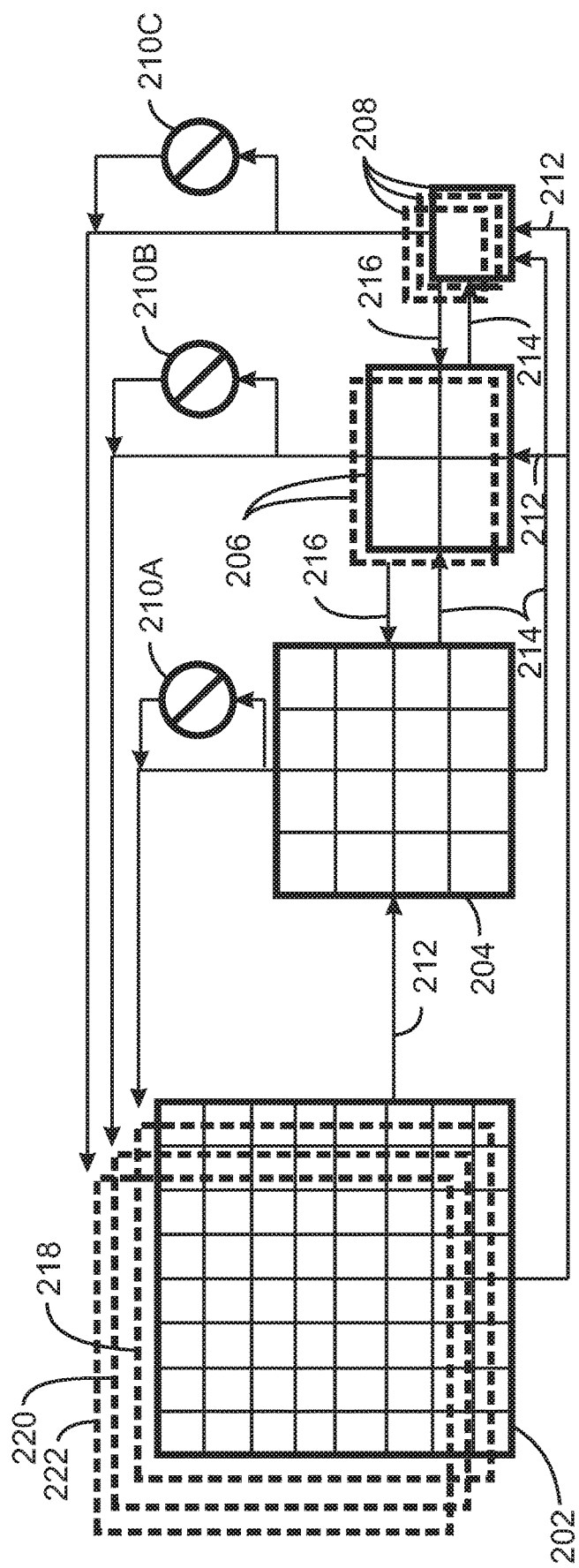
FIG. 2 is a diagram illustrating an example gated dense pyramid block.

FIG. 2 is a diagram illustrating an example gated dense pyramid block. The example gated dense pyramid block is generally referred to by the reference number 200 and can be implemented in the computing device 500 below. For example, the gated dense pyramid block 200 can be generated using the trainer 528 of the computing device 500 of FIG. 5, the method 300 of FIG. 3 below, or the trainer module 606 of the computer readable media 600 of FIG. 6 below. The gated dense pyramid block 200 may also be used as part of a processing network such as in FIG. 1 above, or in the computing device 500 of FIG. 5 and the computer readable media 600 of FIG. 6 below.

The gated dense pyramid block 200 of FIG. 2 includes a base scale layer 202 and a plurality of feature maps 204, 206, and 208 of different scales. For example, feature map 204 may have a smaller scale compared to base layer 202, feature map 206 may have a smaller scale as compared to feature map 204, and feature map 208 may likewise have a smaller scale as compared to feature map 206. The gated dense pyramid block 200 also includes a plurality of gated weights 210A, 210B, and 210C associated with each of the plurality of features maps 204, 206, and 208, respectively. The base scale layer 102 is used to generate feature maps 204, 206, 208 as indicated by arrows 212.

As shown in FIG. 2, the middle layers of the gated dense pyramid block 200, corresponding to feature maps 204 and 206, are densely connected. As used herein, a dense connection refers to making almost all connections between any two middle layers. For example, a dense connection may include including both forward dense connections 214 and backward dense connections 216. In some examples, a dense connection structure may utilize more of the information flow from different layers. In particular, different feature maps from the densely connected layers can be concatenated as shown by concatenated feature maps 218, 220, and 222. For example, the base scale layer 202 may be concatenated with feature maps 218, 220, and 222 by gated and up-sampling of feature maps 204, 206, and 208 as described below.

In the gated dense pyramid block 200 of FIG. 2, multi-scale feature maps can be generated sequentially from one base scale layer. In some examples, the scale of the feature maps can be decreased at the forward layer connections to compress the information. The compressed information can then be used to generate a global contextual feature. For example, the global contextual feature may be a concatenated collection of feature maps. In some examples, the global contextual feature can be used to smooth the prediction results. In some examples, the scale of the features maps can be increased by up-sampling at the backward layer connections. For example, the up-sampling may be used to recover high resolution feature information. The high resolution feature information may be complementary to original large scale feature map. In some examples, the high resolution feature information may be included in the global contextual feature. In this way, more effective local context information can be extracted by this bi-direction dense connection. Both global and local context information may be integrated to improve the capacity of representation of the feature maps. For example, the feature maps may better represent the objects to be detected such that accuracy of detection is improved.

The multi-scale feature maps from both global and local contexts plays may thus be used to improve pixel-wise classification. In some examples, a gated function may also be used to assign different weights to different scale feature maps. For example, the weights may be assigned using the sigmoid function represented by the equation:

$$f = \sigma(x) = \frac{1}{1+e^{-x}} \qquad \text{Eq. 1}$$

where x is the feature map of the bottom layer. In particular, a gated loss branch may be designed to perform segmentation early by a soft-max loss function represented by the equation:

$$L(\theta) = -\frac{1}{N}\sum_{i=1}^{N}\sum_{j=1}^{C} 1[y_i = j]\log\frac{e^{\theta_j^T x_i}}{\sum_{l=1}^{C} e^{\theta_l^T x_i}} \qquad \text{Eq. 2}$$

where N is the number of training samples, C is the number of classes, and y is the ground truth label. Therefore, a prior weight function may be learnt to balance the different scale feature maps. In some examples, the prior weight function may give more weight on more effective scale feature maps and less weight on the less useful scale feature maps. Thus, such an adaptive weighting module may be used to improve the performance of dense pyramid features. In some examples, in order to train a gated weight, a classification layer followed by loss function may be added to the top of gated weight layer. In the inference stage, these extra classification layers can be removed, with only the gated weight layer remaining. Finally, more basic GDP blocks can be added to create a cascade structure. For example, a cascade structure may be a sequence of GDP blocks.

The diagram of FIG. 2 is not intended to indicate that the example gated dense pyramid block 200 is to include all of the components shown in FIG. 2. Rather, the example gated dense pyramid block 200 can be implemented using fewer or additional components not illustrated in FIG. 2 (e.g., additional feature maps, gates, connections, etc.).

Figure 3:
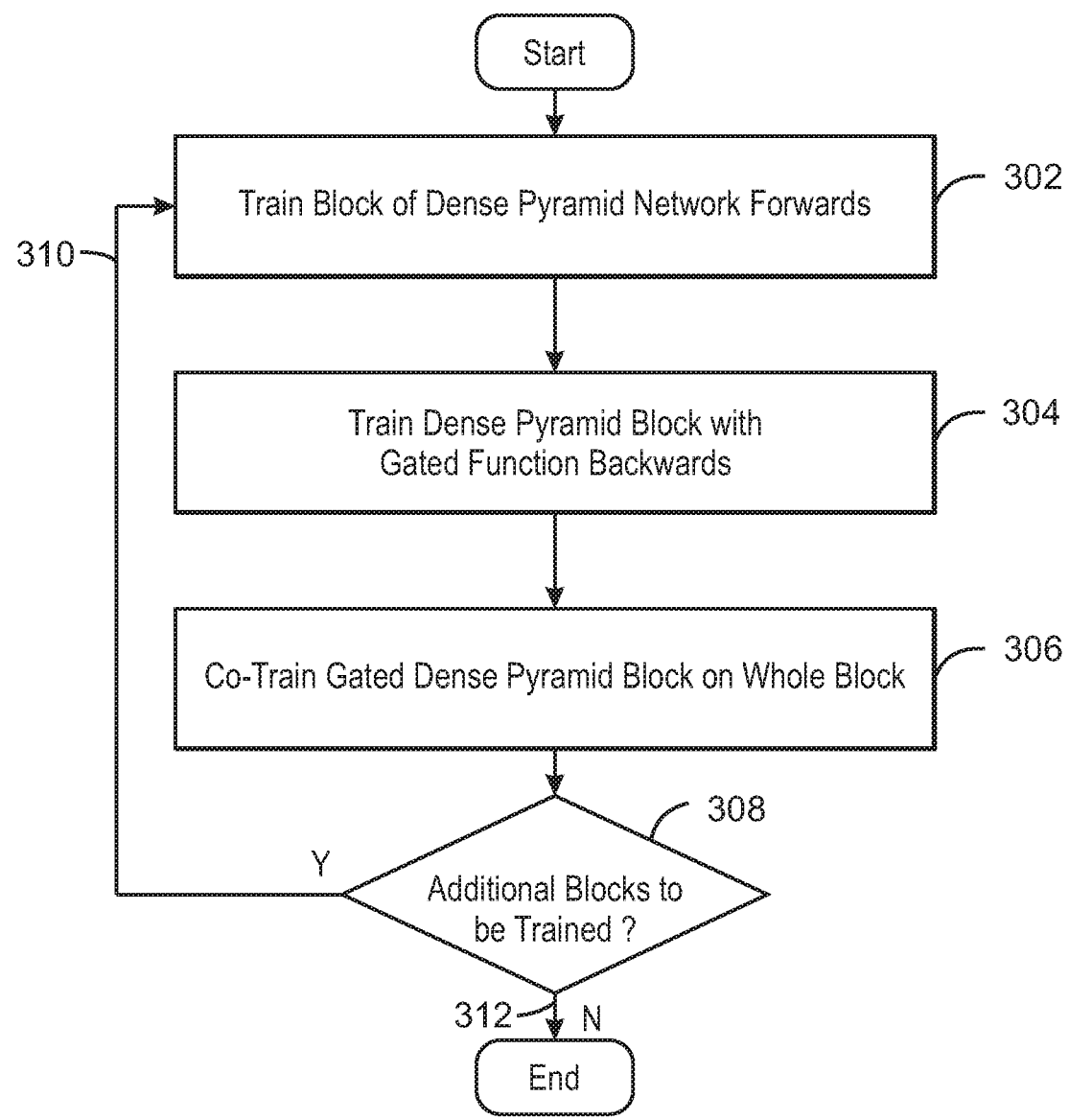
FIG. 3 is a flow chart illustrating an example method for training a gated dense pyramid network.

FIG. 3 is a flow chart illustrating an example method for training a gated dense pyramid network. The example method is generally referred to by the reference number 300 and can be used to train the GDP blocks 106A, 106B, and 106C in the system 100 of FIG. 1 above, the GDP block 200 of FIG. 2 above, or the GDP network 534 of the computing device 500 of FIG. 5 below.

The method 300 may begin at block 302. At block 302, a processor trains a block of a dense pyramid network forwards. For example, the processor may assign parameter values for downscaling feature maps.

At block 304, the processor trains a dense pyramid block backwards with a gated function. For example, the processor may assign parameter values for up-scaling feature maps. In some examples, the processor can assign different weights to different scaled feature maps. For example, the processor may assign the weights using Eq. 2 as described above. In some examples, in order to train a gated weight, a classification layer followed by loss function may be added to the top of gated weight layer. In some examples, the gated function may be an adaptive weighting module that provides more weight on more effective scale feature maps and less weight on the less useful scale feature maps. In some examples, the processor can train a gated weight in the GDP block using a classification layer followed by loss function added to a gated weight layer.

At block 306, the processor co-trains the gated dense pyramid block on a whole of the gated dense pyramid block. For example, blocks 302 and 304 above may be trained together. In some examples, co-training the GDP block may include concatenating up-sampled feature maps from a plurality of densely connected layers of the GDP block with a feature map of a base scale layer of the GDP block. In some examples, the processor can generate a global contextual feature including high resolution feature information from a plurality of densely connected layers of the GDP block.

At decision diamond 308, the processor determines whether additional GDP blocks remain to be trained. If additional GDP blocks remain to be trained, then the method may proceed to block 302 as indicated by arrow 310. If additional GDP blocks to be trained do not remain, then the method may end as indicated by arrow 312.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation.

Figure 4:
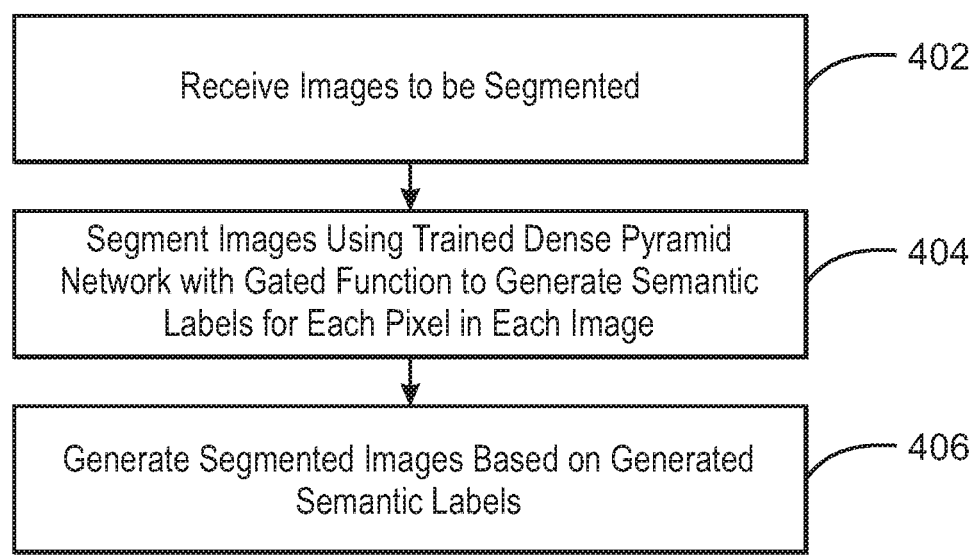
FIG. 4 is a flow chart illustrating a method for segmenting images semantically using gated dense pyramid blocks.

FIG. 4 is a flow chart illustrating a method for segmenting images semantically using gated dense pyramid blocks. The example method is generally referred to by the reference number 400 and can be implemented in the system 100 500 of FIG. 1 above, the semantic image segmenter 530 of the computing device 500 of FIG. 5 below, or the computer readable media 600 of FIG. 6 below.

At block 402, a semantic image segmenter receives images to be segmented. For example, the images may include one or more object to be detected using segmentation.

At block 404, the semantic image segmenter segments the images using a trained dense pyramid network with a gated function to generate semantic labels for each pixel in each image. For example, the gated dense pyramid network may be trained using the method 300 above.

At block 406, the semantic image segmenter generates segmented images based on the generated semantic labels. For example, the segmented images may include one or more detected objects.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation.

Figure 5:
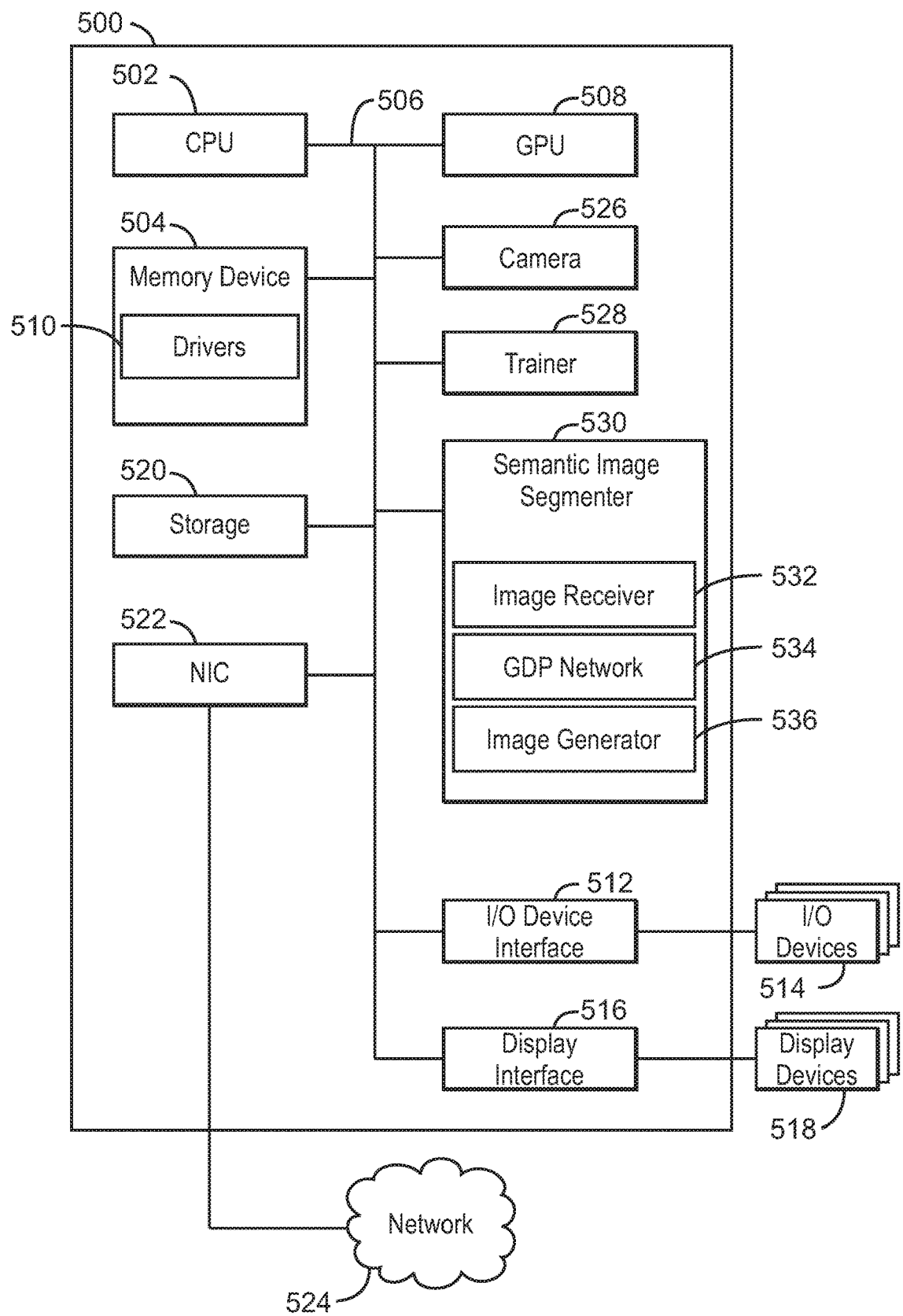
FIG. 5 is block diagram illustrating an example computing device that can segment images semantically using gated dense pyramid blocks.

Referring now to FIG. 5, a block diagram is shown illustrating an example computing device that can segment images semantically using gated dense pyramid blocks. The computing device 500 may be, for example, a laptop computer, desktop computer, tablet computer, mobile device, smart phone, or wearable device, among others. In some examples, the computing device 500 may be a smart camera or a digital security surveillance camera, or an Internet of Things (IoT) device. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for device discovery. The device drivers 510 may be software, an application program, application code, or the like.

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for generating virtual input devices. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device 500 also includes a storage device 520. The storage device 520 is a physical memory such as a hard drive, an optical drive, a thumbdrive, an array of drives, a solid-state drive, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes a camera 526. For example, the camera may include a plurality of image sensors. For example, the camera 526 may be a high-definition red-green-blue (RGB) sensor camera.

The computing device 500 further includes a trainer 528. For example, the trainer 528 can be used to train GDP blocks of a GDP network to generate semantic labels. The computing device 500 can further include semantic image segmenter 530. For example, the semantic image segmenter 530 may include an image receiver 532, a GDP network 534, and an image generator 536. In some examples, each of the components 532-536 of the semantic image segmenter 530 may be a microcontroller, embedded processor, or software module. The image receiver 532 can receive an image to be segmented. For example, the image may be a color image with one or more objects to be segmented. The GDP network 534 can generate semantic labels for each pixel in the received image. For example, the GDP network 534 may include a plurality of GDP blocks trained to generate the semantic labels by the trainer 528. In some examples, the GDP network 534 may include three cascades. In some examples, a GDP block can include a plurality of middle layers coupled by dense connections comprising a forward dense connection and a backward dense connection. For example, the GDP block can include a forward dense connection with a middle layer having a decreased scale to generate down-sampled feature maps. In some examples, a GDP block can include a backward dense connection with a middle layer to generate up-sampled feature maps. In some examples, a GDP block can include a global contextual feature to smooth prediction results. For example, the global contextual feature may include the whole object, not just part of it, or relations between objects, such as people often appears near the bicycle. In some examples, a GDP block can be a multi-gated GDP block. In some examples, a GDP block can be a cascade. The image generator 536 can generate a segmented image based on the generated semantic labels. For example, the segmented image may include one or more segments corresponding to detected objects.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. For example, the computing device 500 may also include a convolutional neural network to preprocess received images. In some examples, the semantic image segmenter 530 may be a block embedded into a neural network. Furthermore, any of the functionalities of the CPU 502 may be partially, or entirely, implemented in hardware and/or in a processor. For example, the functionality of the semantic image segmenter 530 may be implemented with an application specific integrated circuit, in logic implemented in a processor, in logic implemented in a specialized graphics processing unit such as the GPU 508, or in any other device.

Figure 6:
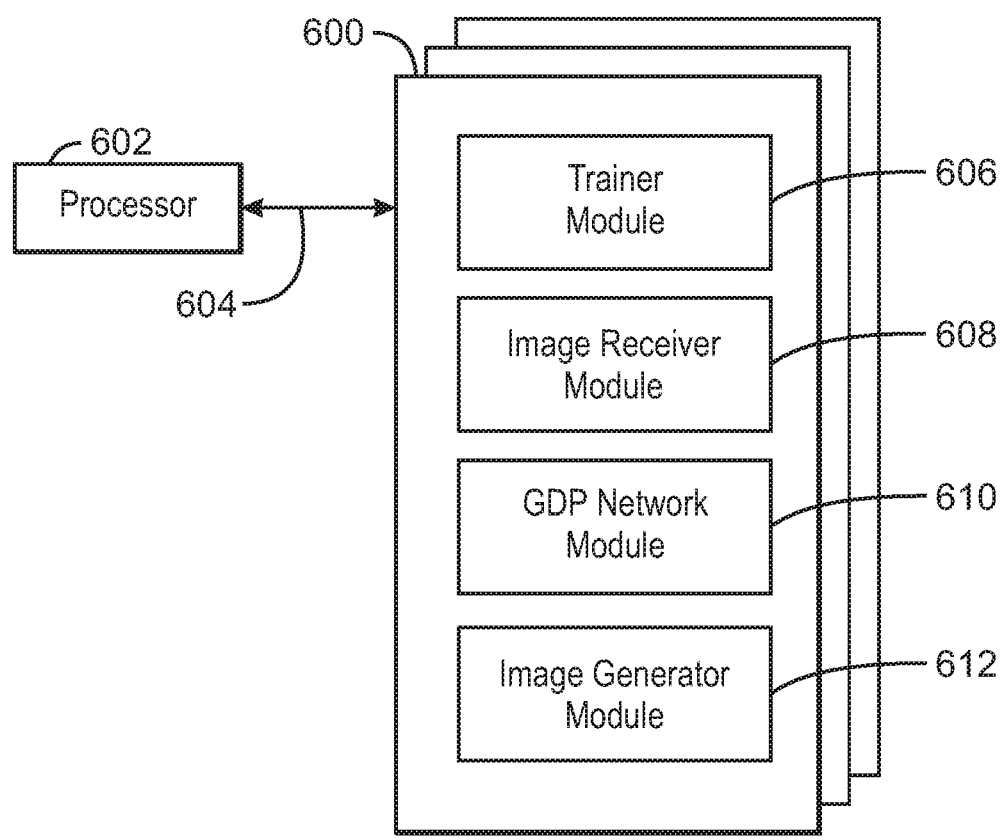
FIG. 6 is a block diagram showing computer readable media that store code for segmenting images semantically using gated dense pyramid networks.

FIG. 6 is a block diagram showing computer readable media 600 that store code for segmenting images semantically using gated dense pyramid networks. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, a trainer module 606 may be configured to train a gated dense pyramid (GDP) block of a GDP network to generate semantic labels. For example, the trainer module 606 may be configured to forward train a block of a GDP network. The trainer module 606 may also be configured to backward train the dense pyramid block with a gated function to generate the GDP block. For example, the trainer module 606 can provide more weight on more effective scale feature maps and less weight on the less useful scale feature maps via a gated weight in the GDP block. The trainer module 606 may further be configured to co-train the gated dense pyramid block on a whole of the GDP block. For example, the trainer module 606 can forward train and backward train the gated dense pyramid network together concurrently. In some examples, the trainer module 606 can train a gated weight in the GDP block using a classification layer followed by loss function added to a gated weight layer. In some example, the trainer module 606 can concatenate up-sampled feature maps from a plurality of densely connected layers of the GDP block with a feature map of a base scale layer of the GDP block. In some examples, the trainer module 606 may also be configured to train additional blocks in response to detecting additional blocks in the GDP network. An image receiver module 608 may be configured to receive an image to be segmented. In some examples, the image receiver module 608 may be configured to receive frames of a video feed. A GDP network module 610 may be configured to process the image to generate a semantic label for each pixel in the image. For example, the GDP network module 610 may be configured to generate an up-scaled feature map to recover high resolution feature information. In some examples, the GDP network module 610 may be configured to generate a feature map with a reduced scale to compress information to obtain a global contextual feature. For example, the global contextual feature can be used to smooth prediction results. In some examples, the GDP network module 608 may be configured to adaptively weight differently scaled feature maps in the GDP block. An image generator module 612 may be configured to generate a segmented image based on the received semantic labels.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

EXAMPLES

Example 1 is an apparatus for semantic image segmentation. The apparatus includes an image receiver to receive an image to be segmented. The apparatus also includes a gated dense pyramid network including a plurality of gated dense pyramid (GDP) blocks to be trained to generate semantic labels for each pixel in the received image. The apparatus further includes and an image generator to generate a segmented image based on the generated semantic labels.

Example 2 includes the apparatus of example 1, including or excluding optional features. In this example, the plurality of GDP blocks are a cascade.

Example 3 includes the apparatus of any one of examples 1 to 2, including or excluding optional features. In this example, a GDP block includes a plurality of middle layers coupled by dense connections including a forward dense connection and a backward dense connection.

Example 4 includes the apparatus of any one of examples 1 to 3, including or excluding optional features. In this example, a GDP block includes a forward dense connection with a middle layer including a decreased scale to generate down-sampled feature maps.

Example 5 includes the apparatus of any one of examples 1 to 4, including or excluding optional features. In this example, a GDP block includes a global contextual feature to smooth prediction results.

Example 6 includes the apparatus of any one of examples 1 to 5, including or excluding optional features. In this example, a GDP block includes a backward dense connection with a middle layer to generate up-sampled feature maps.

Example 7 includes the apparatus of any one of examples 1 to 6, including or excluding optional features. In this example, a GDP block includes a multi-gated GDP block.

Example 8 includes the apparatus of any one of examples 1 to 7, including or excluding optional features. In this example, a GDP block is a cascade GDP block.

Example 9 includes the apparatus of any one of examples 1 to 8, including or excluding optional features. In this example, the apparatus includes a convolutional neural network to preprocess the received image.

Example 10 includes the apparatus of any one of examples 1 to 9, including or excluding optional features. In this example, the apparatus includes a block embedded into a neural network.

Example 11 is a method for training gated dense pyramid networks. The method includes forward training, via a processor, a GDP block including a dense pyramid network. The method also includes backward training, via the processor, the dense pyramid network with a gated function. The method further includes and co-training, via the processor, the gated dense pyramid network on a whole of the GDP block.

Example 12 includes the method of example 11, including or excluding optional features. In this example, forward training the GDP block includes setting one or more parameters to cause the GDP block to generate a feature map with a reduced scale.

Example 13 includes the method of any one of examples 11 to 12, including or excluding optional features. In this example, backward training the dense pyramid network includes setting one or more parameters to cause the GDP block to generate an up-scaled feature map.

Example 14 includes the method of any one of examples 11 to 13, including or excluding optional features. In this example, the method includes connecting two bi-directional layers in the GDP block using concatenation.

Example 15 includes the method of any one of examples 11 to 14, including or excluding optional features. In this example, the method includes iteratively training additional GDP blocks.

Example 16 includes the method of any one of examples 11 to 15, including or excluding optional features. In this example, co-training the gated dense pyramid network on the whole of the GDP block includes forward training and backward training the gated dense pyramid network together.

Example 17 includes the method of any one of examples 11 to 16, including or excluding optional features. In this example, the gated function includes an adaptive weighting module that provides more weight on more effective scale feature maps and less weight on the less useful scale feature maps.

Example 18 includes the method of any one of examples 11 to 17, including or excluding optional features. In this example, the method includes training a gated weight in the GDP block using a classification layer followed by loss function added to a gated weight layer.

Example 19 includes the method of any one of examples 11 to 18, including or excluding optional features. In this example, the method includes concatenating up-sampled feature maps from a plurality of densely connected layers of the GDP block with a feature map of a base scale layer of the GDP block.

Example 20 includes the method of any one of examples 11 to 19, including or excluding optional features. In this example, the method includes generating a global contextual feature including high resolution feature information from a plurality of densely connected layers of the GDP block.

Example 21 is at least one computer readable medium for segmenting images semantically using gated dense pyramid networks having instructions stored therein that. The computer-readable medium includes instructions that direct the processor to train a gated dense pyramid (GDP) block of a GDP network to generate semantic labels. The computer-readable medium includes instructions that direct the processor to receive an image to be segmented. The computer-readable medium includes instructions that direct the processor to process the image, via the GDP network, to generate a semantic label for each pixel in the image. The computer-readable medium includes instructions that direct the processor to generate a segmented image based on the received semantic labels.

Example 22 includes the computer-readable medium of example 21, including or excluding optional features. In this example, the computer-readable medium includes instructions to: forward train a block of a GDP network; backward train the dense pyramid block with a gated function to generate the GDP block; and co-train the gated dense pyramid block on a whole of the GDP block.

Example 23 includes the computer-readable medium of any one of examples 21 to 22, including or excluding optional features. In this example, the computer-readable medium includes instructions to adaptively weight differently scaled feature maps in the GDP block.

Example 24 includes the computer-readable medium of any one of examples 21 to 23, including or excluding optional features. In this example, the computer-readable medium includes instructions to generate an up-scaled feature map to recover high resolution feature information.

Example 25 includes the computer-readable medium of any one of examples 21 to 24, including or excluding optional features. In this example, the computer-readable medium includes instructions to generate a feature map with a reduced scale to compress information to obtain a global contextual feature.

Example 26 includes the computer-readable medium of any one of examples 21 to 25, including or excluding optional features. In this example, the computer-readable medium includes instructions to forward train and backward train the gated dense pyramid network together.

Example 27 includes the computer-readable medium of any one of examples 21 to 26, including or excluding optional features. In this example, the computer-readable medium includes instructions to provide more weight on more effective scale feature maps and less weight on the less useful scale feature maps via a gated weight in the GDP block.

Example 28 includes the computer-readable medium of any one of examples 21 to 27, including or excluding optional features. In this example, the computer-readable medium includes instructions to train a gated weight in the GDP block using a classification layer followed by loss function added to a gated weight layer.

Example 29 includes the computer-readable medium of any one of examples 21 to 28, including or excluding optional features. In this example, the computer-readable medium includes instructions to concatenate up-sampled feature maps from a plurality of densely connected layers of the GDP block with a feature map of a base scale layer of the GDP block.

Example 30 includes the computer-readable medium of any one of examples 21 to 29, including or excluding optional features. In this example, the computer-readable medium includes instructions to smooth prediction results using a global contextual feature.

Example 31 is a system for semantic image segmentation. The system includes an image receiver to receive an image to be segmented. The system also includes a gated dense pyramid network including a plurality of gated dense pyramid (GDP) blocks to be trained to generate semantic labels for each pixel in the received image. The system further includes an image generator to generate a segmented image based on the generated semantic labels.

Example 32 includes the system of example 31, including or excluding optional features. In this example, the plurality of GDP blocks includes a cascade.

Example 33 includes the system of any one of examples 31 to 32, including or excluding optional features. In this example, a GDP block includes a plurality of middle layers coupled by dense connections including a forward dense connection and a backward dense connection.

Example 34 includes the system of any one of examples 31 to 33, including or excluding optional features. In this example, a GDP block includes a forward dense connection with a middle layer including a decreased scale to generate down-sampled feature maps.

Example 35 includes the system of any one of examples 31 to 34, including or excluding optional features. In this example, a GDP block includes a global contextual feature to smooth prediction results.

Example 36 includes the system of any one of examples 31 to 35, including or excluding optional features. In this example, a GDP block includes a backward dense connection with a middle layer to generate up-sampled feature maps.

Example 37 includes the system of any one of examples 31 to 36, including or excluding optional features. In this example, a GDP block includes a multi-gated GDP block.

Example 38 includes the system of any one of examples 31 to 37, including or excluding optional features. In this example, a GDP block includes a cascade GDP block.

Example 39 includes the system of any one of examples 31 to 38, including or excluding optional features. In this example, the system includes a convolutional neural network to preprocess the received image.

Example 40 includes the system of any one of examples 31 to 39, including or excluding optional features. In this example, the system includes a neural network.

Example 41 is a system for semantic image segmentation. The system includes means for receiving an image to be segmented. The system also includes means for generating semantic labels for each pixel in the received image. The system further includes means for generating a segmented image based on the generated semantic labels.

Example 42 includes the system of example 41, including or excluding optional features. In this example, the means for generating semantic labels includes a cascade of GDP blocks.

Example 43 includes the system of any one of examples 41 to 42, including or excluding optional features. In this example, the means for generating semantic labels a plurality of middle layers coupled by dense connections including a forward dense connection and a backward dense connection.

Example 44 includes the system of any one of examples 41 to 43, including or excluding optional features. In this example, the means for generating semantic labels includes a forward dense connection with a middle layer including a decreased scale to generate down-sampled feature maps.

Example 45 includes the system of any one of examples 41 to 44, including or excluding optional features. In this example, the means for generating semantic labels includes a global contextual feature to smooth prediction results.

Example 46 includes the system of any one of examples 41 to 45, including or excluding optional features. In this example, the means for generating semantic labels a backward dense connection with a middle layer to generate up-sampled feature maps.

Example 47 includes the system of any one of examples 41 to 46, including or excluding optional features. In this example, the means for generating semantic labels includes a multi-gated GDP block.

Example 48 includes the system of any one of examples 41 to 47, including or excluding optional features. In this example, the means for generating semantic labels includes a cascade GDP block.

Example 49 includes the system of any one of examples 41 to 48, including or excluding optional features. In this example, the system includes means for preprocessing the received image.

Example 50 includes the system of any one of examples 41 to 49, including or excluding optional features. In this example, the system includes a neural network.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for semantic image segmentation, the apparatus comprising:
    an image receiver to receive an image to be segmented;
    a gated dense pyramid network comprising a plurality of gated dense pyramid (GDP) blocks to be trained to generate semantic labels for respective pixels in the received image, wherein a first one of the GDP blocks includes at least one of (i) a plurality of middle layers coupled by dense connections including a forward dense connection and a backward dense connection, (ii) a forward dense connection with a middle layer having a decreased scale to generate down-sampled feature maps, (iii) a global contextual feature to smooth prediction results, or (iv) a backward dense connection with a middle layer to generate up-sampled feature maps; and
    an image generator to generate a segmented image based on the generated semantic labels.

2. The apparatus of claim 1, wherein the plurality of GDP blocks forms a cascade structure.

3. The apparatus of claim 1, wherein a second one of the GDP blocks corresponds to a multi-gated GDP block.

4. The apparatus of claim 1, wherein a second one of the GDP blocks corresponds to a cascade GDP block.

5. The apparatus of claim 1, wherein the plurality of GDP blocks is embedded into a neural network.

6. An apparatus for semantic image segmentation, the apparatus comprising:
    an image receiver to receive an image to be segmented;
    a gated dense pyramid network comprising a plurality of gated dense pyramid (GDP) blocks to be trained to generate semantic labels for respective pixels in the received image;
    an image generator to generate a segmented image based on the generated semantic labels; and
    a convolutional neural network to preprocess the received image.

7. A method for training gated dense pyramid networks, the method comprising:
    forward training, via a processor, a gated dense pyramid (GDP) block of a gated dense pyramid network;
    backward training, via the processor, the GDP block of the gated dense pyramid network with a gated function; and
    co-training, via the processor, the gated dense pyramid network based on a whole of the GDP block.

8. The method of claim 7, wherein the forward training of the GDP block includes setting one or more parameters to cause the GDP block to generate a feature map with a reduced scale.

9. The method of claim 7, wherein the backward training of the GDP block includes setting one or more parameters to cause the GDP block to generate an up-scaled feature map.

10. The method of claim 7, further including connecting two bi-directional layers in the GDP block using concatenation.

11. The method of claim 7, further including iteratively training additional GDP blocks.

12. The method of claim 7, wherein the co-training of the gated dense pyramid network based on the whole of the GDP block includes forward training and backward training the gated dense pyramid network together.

13. The method of claim 7, wherein the gated function includes an adaptive weighting module that provides more weight on more effective scale feature maps and less weight on less useful scale feature maps.

14. The method of claim 7, further including training a gated weight in the GDP block using a classification layer followed by loss function added to a gated weight layer.

15. The method of claim 7, further including concatenating up-sampled feature maps from a plurality of densely connected layers of the GDP block with a feature map of a base scale layer of the GDP block.

16. The method of claim 7, further including generating a global contextual feature including high resolution feature information from a plurality of densely connected layers of the GDP block.

17. At least one computer readable storage device comprising instructions that, when executed on a computing device, cause the computing device to at least:
    train a gated dense pyramid (GDP) block of a GDP network to generate semantic labels;
    receive an image to be segmented;
    process the image, via the GDP network, to generate semantic labels for respective pixels in the image; and
    generate a segmented image based on the generated semantic labels for the respective pixels in the image;
    wherein to train the GDP block of the GDP network, the instructions cause the computing device to:
        forward train the GDP block of the GDP network;
        backward train the GDP block with a gated function; and
        co-train the GDP block based on a whole of the GDP block.

18. The at least one computer readable storage device of claim 17, wherein the instructions cause the computing device to adaptively weight differently scaled feature maps in the GDP block.

19. The at least one computer readable storage device of claim 17, wherein the instructions cause the computing device to generate an up-scaled feature map to recover high resolution feature information.

20. The at least one computer readable storage device of claim 17, wherein the instructions cause the computing device to generate a feature map with a reduced scale to compress information to obtain a global contextual feature to be used to smooth prediction results.

\* \* \* \* \*